Dec. 28, 1926.
J. W. JARMON
1,612,293
LISTER CULTIVATOR
Filed March 17, 1926
3 Sheets-Sheet 3
Fig. 4.
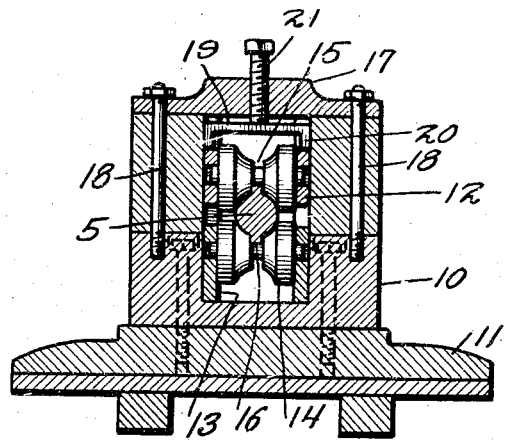
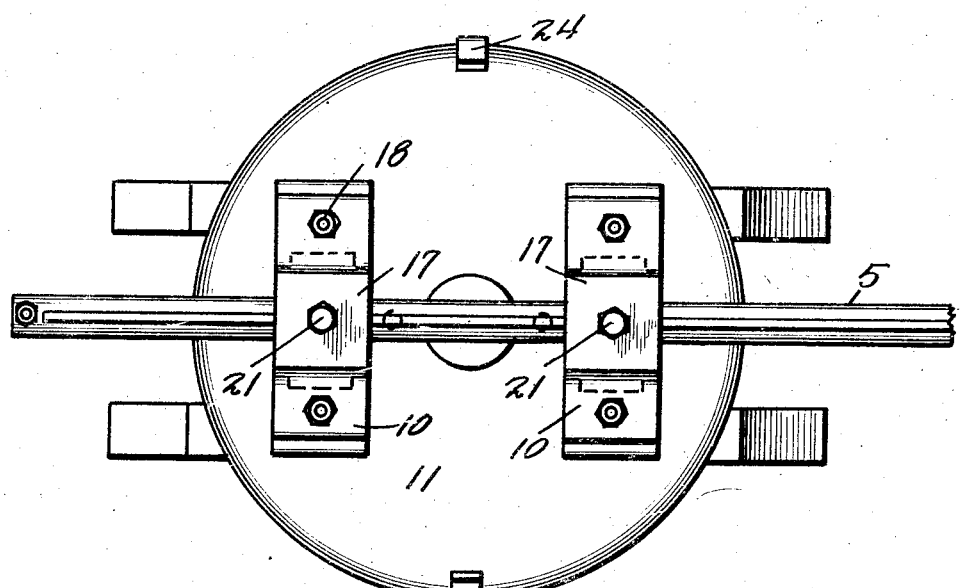
Fig. 5.
John W. Jarmon, Inventor
By Richard B. Owen
Attorney
Witnesses Patented Dec. 28, 1926.

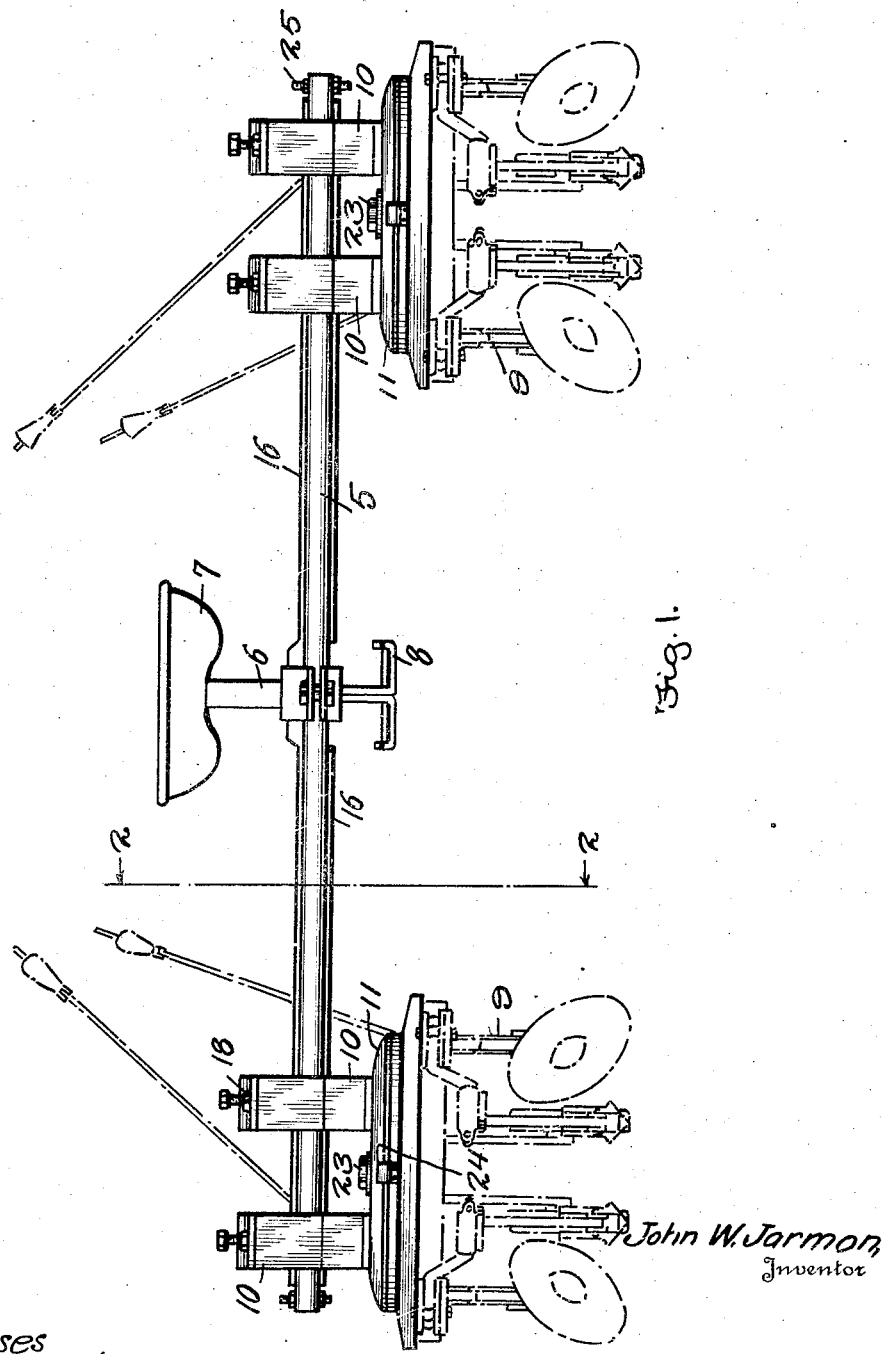

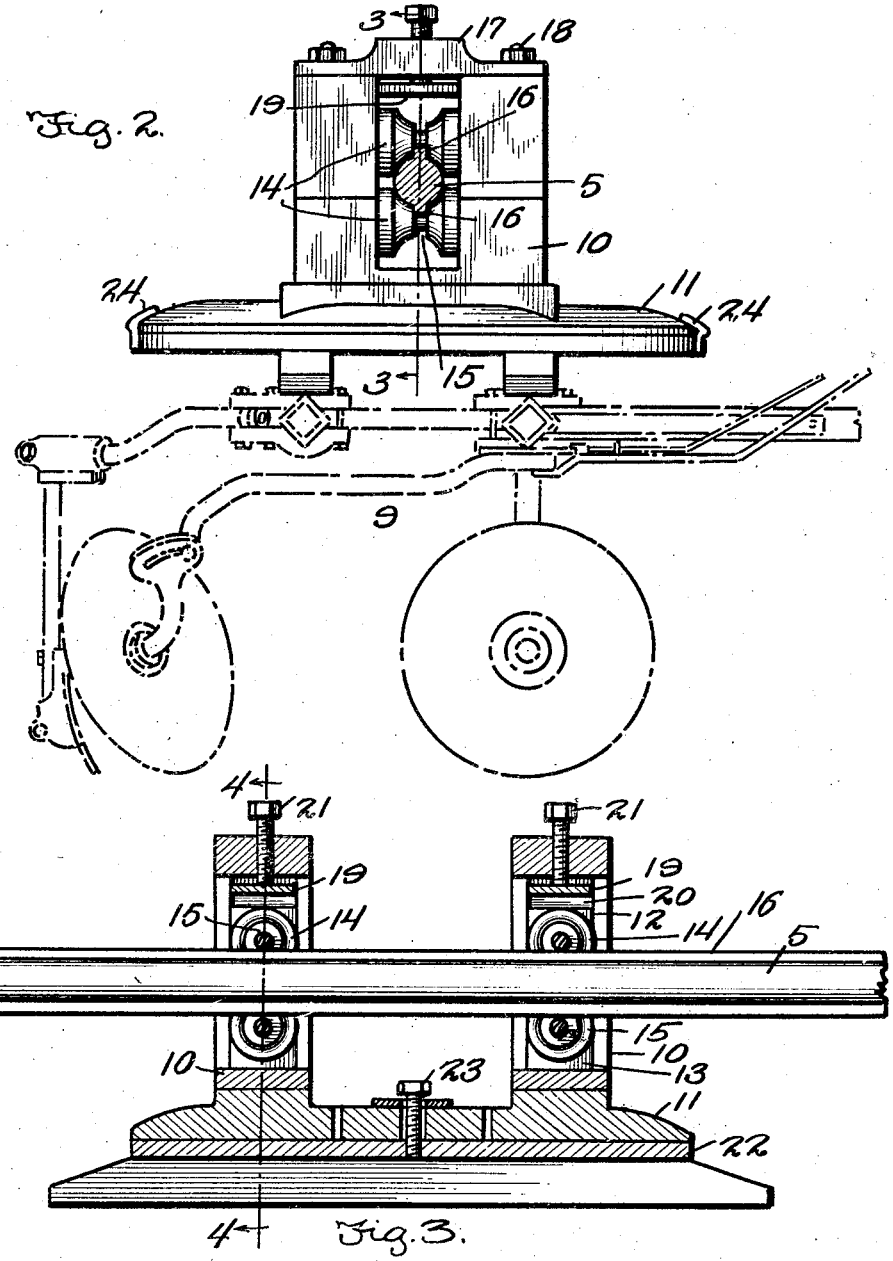

1,612,293

UNITED STATES PATENT OFFICE.

JOHN W. JARMON, OF FREDERICK, OKLAHOMA.

LISTER CULTIVATOR.

Application filed March 17, 1926. Serial No. 95,375.

This invention relates to improvements in lister cultivators, and has more particular reference to two-row lister cultivators.

The primary object of the present invention is to provide improved means for slidably associating the cultivating units or mechanisms with the transverse seat bar of the cultivator whereby extreme freedom of movement of the cultivator units laterally toward and away from each other is insured so that the cultivator units may readily follow irregular rows or furrows.

A further object is to provide simple, durable and effective means for slidably associating the cultivator units with the seat bar so that turning of the seat bar is prevented in an effective manner so as to insure retention of the operator's seat at the required position when the cultivator is in use.

Still another object of the invention is to provide means for permitting the cultivator units to swing laterally so that they may follow the irregular rows or furrows even though the seat bar be moved to an oblique position during use of the cultivator with one cultivator unit operating slightly in advance of the other.

A further specific object of the invention is to provide means for slidably and pivotally associating the cultivator units with the seat bar of a two-row lister cultivator, whereby an effective cultivating operation is had under varying conditions, the construction being simple and durable so as to be capable of long continued use without special skill or attention.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 1 is a rear elevational view of a cultivator constructed in accordance with the present invention, the cultivator units being indicated by dotted lines;

Figure 2 is a vertical section taken upon line 2—2 of Figure 1;

Figure 3 is a section taken upon line 3—3 of Figure 2;

Figure 4 is a section taken upon line 4—4 of Figure 3; and

Figure 5 is a top plan view of the device shown in Figure 3.

Referring more in detail to the drawings, 5 indicates a transverse horizontal bar upon the intermediate portion of which is suitably rigidly secured an upright or post 6 carrying the usual form of seat 7 for accommodating the operator of the cultivator, suitable foot rests 8 being also fixed to and disposed forwardly of the bar 5 for the convenience of the operator.

Slidable longitudinally on the ends of the bar 5 for lateral movement toward and away from each other are the pair of cultivator units generally indicated at 9, the free lateral movement of the units being permitted so that the cultivator units may readily follow irregular rows or furrows as is well known in the art.

The present invention specifically embodies improved means for slidably associating the cultivator units with the bar 5, and such means preferably includes provision for permitting free lateral swinging movement of the cultivator units relative to the bar 5 so that said units will readily follow the rows or furrows even though the bar 5 be shifted to an angle to or obliquely of the line of travel when the cultivator is in use, under which conditions, one cultivator unit would be disposed to operate slightly in advance of the other.

In accordance with the present invention, a pair of upright U-shaped supports are provided at each end of the bar 5 and rigidly secured upon a horizontal supporting disk 11 in spaced side by side relation at opposite sides of the center of the disk as clearly shown in Figures 1 and 3. Vertical grooves are provided in the inner sides of the upwardly projecting legs of each support 10 as clearly shown in Figures 3 and 4 and slidably disposed in these grooves are two pairs of superposed bearing plates 12 and 13 respectively. Each pair of bearing plates support horizontal antifriction rollers 14 so that a pair of said rollers is carried in superposed relation in each support 10, and the bar 5 projects between the pair of rollers of each support 10. Thus, each disk 11 is mounted upon an end of the bar 5 by means of a pair of spaced slide bearing constructions, and the bar 5 is so shaped and fitted by the rollers 14 as to effectively prevent turning of the bar 5 in the support 10 whereby the seat 7 will be maintained in its proper position for supporting the operator, under all conditions. As shown, the rollers 14 are grooved to generally conform to the circular cross section of the main or body portion of the bar 5, while the rollers 14 are further centrally reduced or grooved as at 15 to snugly receive longitudinal ribs 16 provided rigidly upon the upper and lower portions of the bar 5. In this manner the turning of the bar 5 is effectively prevented and extreme freedom of movement of the slide bearings on the bar is insured. The upper ends of the legs of each support 10 are spanned by means of a cap bar or plate 17 which is rigidly secured in place by means of bolts 18, and the legs of each support 10 are preferably made of sectional form as shown in Figure 4 with the bolts 18 also securing the sections thereof together. This construction is preferable for facilitating manufacture as well as expediting assembling or dis-assembling the parts. An adjusting plate 19 is disposed between the legs of each support 10 beneath the cap bar 17 and has downturned ends 20 fitting in the grooves and bearing upon the upper edges of the upper bearing plates 12. An adjusting screw 21 is threaded through the central portion of each cap bar 17 so as to have its lower end bear upon the central portion of the associated plate 19, whereby, upon turning said adjusting screw 21 in one direction, the upper roller may be forced into the required frictional contact with the bar 5 so as to cause corresponding engagement of the bar with the lower roller and thereby attain most effective operation of the device.

Each cultivator unit 9 is suitably rigidly attached to the underside of a second relatively large disk 22, and each disk 11 is flatly disposed upon a disk 22 and centrally pivoted to the latter as at 23 upon a vertical axis whereby the cultivator units are permitted to freely swing in a lateral direction relative to the bar 5. The preferred manner of pivoting each pair of disks 11 and 22 together consists in threading a screw into the lower disk 22 so that the same freely passes through a larger opening in the disk 11 as shown in Figure 3, and in order to further restrain the associated disks 11 and 22 against relative lateral displacement, suitable rigid lips 24 are provided upon the periphery of the lower disk 22 so as to project upwardly and fit over the rounded edge of the adjacent disk 11 as shown clearly in Figures 2 and 5. Suitable stops will be provided at the ends of the bar 5 for limiting the separating movement of the cultivator units, such as the cross pins shown at 25 and arranged to engage the rollers of the outer slide bearings of each cultivator unit.

From the above it will be seen that each cultivator unit is slidably associated with an end portion of the bar 5 by means of a pair of spaced slide bearings which insure against binding so that free movement of the cultivator units toward and away from each other is had. It will also be seen that the required prevention of turning of bar 5 will be effectively had and that the lateral swinging of the cultivator units is made possible by means of a construction which is durable and free of play by reason of having the characteristics of turn tables or large fifth wheel constructions as embodied in wagon constructions.

It will be further seen that by reason of permitting the swinging of the cultivator units, they will readily follow irregular rows or furrows even though one unit be shifted to a position in advance of the other by sudden movement of the bar 5 to a position oblique to the line of travel of the cultivator. The disks 22 also furnish effective means for facilitating proper attachment of the cultivator units to the slide bearings.

Minor changes may be made without departing from the spirit and scope of the invention as claimed.

What I claim as new is:—

1. In a two-row lister cultivator, a transverse horizontal seat bar, a pair of spaced slide bearings movable longitudinally upon each end portion of the bar, said bar and said slide bearings being cooperatively constructed to prevent turning of the bar in said slide bearings, a support upon which each pair of slide bearings is rigidly mounted, and means associated with each support for facilitating attachment of a cultivating unit thereto.

2. In a two-row lister cultivator, a transverse horizontal seat bar, a pair of spaced slide bearings movable longitudinally upon each end portion of the bar, said bar and said slide bearings being cooperatively constructed to prevent turning of the bar in said slide bearings, a support upon which each pair of slide bearings is rigidly mounted, means associated with each support for facilitating attachment of a cultivating unit thereto, said supports comprising relatively large horizontal disks, further relatively large horizontal disks pivoted to the undersides of the first named disks for rotation about a vertical axis, the means for facilitating attachment of the cultivating units being carried by the undersides of the last named disks.

3. In a two-row lister cultivator, a transverse horizontal seat bar, a pair of spaced slide bearings movable longitudinally upon each end of the seat bar, a turn table supporting each pair of slide bearings and embodying upper and lower disks, and a cultivating unit attached to the lower disk of each turn table.

4. In a two-row lister cultivator, a transverse horizontal seat bar having rigid longitudinal ribs upon the upper and lower side portions thereof, a pair of slide bearings fixed in spaced side by side relation and movable longitudinally upon each end portion of the seat bar, each slide bearing embodying a pair of super-imposed anti-friction rollers arranged to fit the bar and the ribs of the latter and to receive the bar therebetween whereby turning of the bar is prevented, and a cultivating unit supporting each pair of slide bearings.

5. In a two-row lister cultivator, a transverse horizontal seat bar having rigid longitudinal ribs upon the upper and lower side portions thereof, a pair of slide bearings fixed in spaced side by side relation and movable longitudinally upon each end portion of the seat bar, each slide bearing embodying a pair of super-imposed anti-friction rollers arranged to fit the bar and the ribs of the latter and to receive the bar therebetween whereby turning of the bar in the bearings is prevented, a cultivating unit supporting each pair of slide bearings, each slide bearing embodying means for adjusting the upper roller thereof toward the shaft and the lower roller of the same for regulating the amount of pressure with which the rollers engage the seat bar.

6. In a two-row lister cultivator, a transverse horizontal seat bar, slide bearings movable longitudinally upon the ends of the seat bar, a support upon which said slide bearings are fixed, and cultivating units pivoted to the supports for lateral swinging movement.

In testimony whereof I affix my signature.

JOHN W. JARMON.